US010119984B2

(12) United States Patent
Hyland et al.

(10) Patent No.: US 10,119,984 B2
(45) Date of Patent: Nov. 6, 2018

(54) APPARATUS FOR DETECTING AND RECORDING ACCELERATIONS EXPERIENCED BY A STRUCTURE, AND A METHOD OF OPERATING THE APPARATUS

(71) Applicant: SEISMO HOLDINGS LIMITED, Auckland (NZ)

(72) Inventors: Clark William Keith Hyland, Auckland (NZ); Benjamin Andrew Hyland, Auckland (NZ)

(73) Assignee: SEISMO HOLDINGS LIMITED, Auckland (NZ)

( * ) Notice: Subject to any disclaimer, the term of this patent is extended or adjusted under 35 U.S.C. 154(b) by 135 days.

(21) Appl. No.: 15/121,431

(22) PCT Filed: Feb. 26, 2015

(86) PCT No.: PCT/NZ2015/050018
§ 371 (c)(1),
(2) Date: Aug. 25, 2016

(87) PCT Pub. No.: WO2015/130178
PCT Pub. Date: Sep. 3, 2015

(65) Prior Publication Data
US 2016/0363606 A1    Dec. 15, 2016

(30) Foreign Application Priority Data

Feb. 27, 2014   (NZ) ......................................... 621820
Sep. 11, 2014   (NZ) ......................................... 631175

(51) Int. Cl.
*G01V 1/24*         (2006.01)
*G01P 1/12*         (2006.01)
(Continued)

(52) U.S. Cl.
CPC .............. *G01P 1/127* (2013.01); *G01P 1/023* (2013.01); *G01V 1/247* (2013.01); *G01V 1/008* (2013.01)

(58) Field of Classification Search
CPC ...... G01M 5/0066; G01M 5/00; G01V 1/247; G01V 1/008; G01P 1/023; G01P 1/127
See application file for complete search history.

(56) References Cited

U.S. PATENT DOCUMENTS 4,901,575 A  *  2/1990  Bohannan ................ G01H 1/00
                                                             73/587
7,005,993 B2    2/2006  Webb et al.
(Continued)

*Primary Examiner* — Mischita Henson
(74) *Attorney, Agent, or Firm* — Duane Morris LLP; Gregory M. Lefkowitz; Jason M. Nolan

(57) ABSTRACT

An apparatus for detecting and recording accelerations experienced by a structure and a method for operating the apparatus are provided. The apparatus includes an accelerometer, processor, and non-volatile computer memory device. The method includes operating the apparatus in a reduced power state, detecting an acceleration having a magnitude that is greater than a first preselected threshold magnitude, switching each of the accelerometer, processor, and non-volatile computer memory device to a fully operational state, storing accelerometer data in a buffer, switching the processor and computer memory device to a reduced power state until the accelerometer signals that further data is available, storing any further accelerometer data in the buffer, and repeating the steps until a predetermined time has elapsed since the accelerometer last detected an acceleration having a magnitude which is greater than a second preselected threshold magnitude.

24 Claims, 5 Drawing Sheets

(51) Int. Cl.
*G01P 1/02* (2006.01)
*G01V 1/00* (2006.01)

(56) References Cited

U.S. PATENT DOCUMENTS

| | | | |
|---|---|---|---|
| 9,903,841 B2* | 2/2018 | Heo | G01N 29/14 |
| 2002/0072838 A1* | 6/2002 | McClellan | G01D 9/005 |
| | | | 73/489 |
| 2010/0238027 A1* | 9/2010 | Bastianini | G01D 9/005 |
| | | | 340/540 |
| 2010/0271199 A1* | 10/2010 | Belov | G01M 5/00 |
| | | | 340/539.3 |
| 2012/0258433 A1* | 10/2012 | Hope | G06F 19/3481 |
| | | | 434/247 |
| 2013/0231890 A1 | 9/2013 | Schiefferdecker et al. | |
| 2014/0142871 A1 | 5/2014 | Lombriser et al. | |
| 2014/0358473 A1* | 12/2014 | Goel | A61B 5/1118 |
| | | | 702/141 |

* cited by examiner

APPARATUS FOR DETECTING AND RECORDING ACCELERATIONS EXPERIENCED BY A STRUCTURE, AND A METHOD OF OPERATING THE APPARATUS

CROSS-REFERENCE TO RELATED APPLICATIONS

This application is a § 371 national stage entry of International Application No. PCT/NZ2015/050018, filed Feb. 26, 2015, which claims priority to New Zealand Patent Application No. 621820, filed Feb. 27, 2014, and New Zealand Patent Application No. 631175, filed Sep. 11, 2014, the entire contents of which are incorporated herein by reference.

The present invention relates to an apparatus for detecting and recording the accelerations experienced by a structure due to forces such as seismic activity and the like, and to a method of operating such an apparatus.

BACKGROUND TO THE INVENTION

Many cities are built in seismically active areas in which earthquakes or other seismic activity occur from time to time.

When a significant seismic event does occur it is necessary for existing buildings and other structures to be checked to confirm how the structure has reacted, whether it is in need of repair, how urgently any repairs are required, and whether it can continue to be used in the meantime.

Although the seismic activity of most areas is recorded on a macro scale, for example by government operated seismic monitoring stations, the accelerations experienced by a particular building may be influenced by the local geology, the design and construction of the building, and other factors.

In assessing the safety and performance of a particular building it would be of benefit to have a record of the actual accelerations (magnitude and direction) experienced by the building. In the case of particularly large or tall structures it would be desirable to have information from several parts of the structure, for example from different floors of multi-storey buildings.

The prior art contains examples of apparatus for detecting and recording the effect of seismic activity on such structures. However, these tend to be large and expensive items of equipment which often require attention after each seismic event recorded, and which cannot operate for extended periods without some form of maintenance. As a result, such apparatus are not widely used at present.

As well as seismic activity, other forces such as high winds, heavy traffic, explosions, and in some cases pedestrian activity, may cause movement in a structure which needs to be recorded and analysed in order to confirm that the structure is safe, or to identify parts of the structure which require repair.

The reference to any prior art in the specification is not, and should not be taken as, an acknowledgement or any form of suggestion that the prior art forms part of the common general knowledge in any country.

It is accordingly an object of the present invention to provide an apparatus and/or system for detecting and recording accelerations experienced by a structure and/or a method of operating such apparatus, which will overcome or ameliorate problems with such methods and/or apparatus at present, or which will at least provide a useful choice.

Further objects of the present invention may become apparent from the following description, which is given by way of example only.

BRIEF SUMMARY OF THE INVENTION

According to one aspect of the present invention there is provided a method of operating an apparatus for detecting and recording accelerations experienced by a structure, the apparatus comprising an accelerometer, a processor and a non-volatile computer memory device, the method comprising the following steps:
  i. operating the processor, accelerometer and computer memory device in a reduced power state;
  ii. in response to detecting an acceleration having a magnitude which is greater than a first preselected threshold magnitude, switching the accelerometer to a fully operational state and storing accelerometer data in a buffer;
  iii. switching the processor and computer memory device to a fully operational state;
  iv. operating the processor to store the accelerometer data from the buffer in the computer memory device;
  v. switching the processor and computer memory device to a reduced power state until the accelerometer signals that further data is available, and storing any further accelerometer data in the buffer;
  vi. repeating steps iii) to v) until a predetermined time has elapsed since the accelerometer last detected an acceleration having a magnitude which is greater than a second preselected threshold magnitude.

Preferably the method comprises the further step of:
  vii. switching the processor, accelerometer and computer memory device to the reduced power state.

Preferably the method comprises repeating steps i) to vii).

Preferably step iii) further comprises the step of creating a new file on the computer memory device and step iv) comprises the step of storing the accelerometer data from the buffer in the new file.

Preferably the first preselected threshold magnitude equals 0.02G.

Preferably the first preselected threshold magnitude equals 0.001G.

Preferably the second preselected threshold magnitude equals 0.02G.

Preferably the second preselected threshold magnitude equals 0.001G.

Preferably the predetermined time comprises 5 seconds.

Preferably the apparatus comprises a further sensor and step ii) further comprises the step of switching the further sensor to a fully operational state and storing data from the further sensor in the buffer.

Preferably step v) further includes the step of switching the further sensor to a reduced power state or an off state.

Preferably the non-volatile computer memory device comprises a secure digital (SD) card, or more preferably a microSD card.

Preferably the apparatus further comprises a Universal Serial Bus (USB) connector in communication with the processor, and wherein the processor sends data indicative of the output of the accelerometer to the USB connector.

According to a second aspect of the present invention there is provided an apparatus for detecting and recording accelerations experienced by a structure, the apparatus comprising a housing, a processor provided within the housing, an accelerometer connected to an interior of the housing an in communication with the processor, and non-volatile computer memory device connection means connected to the processor, the connection means adapted for releasable connection to at least one non-volatile computer memory device, wherein, in use:
i. the processor, accelerometer and computer memory device initially operate in a reduced power state;
ii. the accelerometer switches to a fully operational state and stores accelerometer data in a buffer in response to detecting an acceleration having a magnitude which is greater than a first preselected threshold magnitude;
iii. the processor and computer memory device switch to a fully operational state in response to the accelerometer detecting an acceleration having a magnitude which is greater than the first preselected threshold magnitude;
iv. the processor stores the accelerometer data from the buffer in a computer memory device which is coupled to the connection means;
v. the processor and computer memory device switch to a reduced power state until the accelerometer signals that further data is available, and stores any further accelerometer data in the buffer; and
vi. the apparatus repeats steps iii) to v) until a predetermined time has elapsed since the accelerometer last detected an acceleration having a magnitude which is greater than a second preselected threshold magnitude.

Preferably the first preselected threshold magnitude comprises 0.02G.

Preferably the second preselected threshold magnitude comprises 0.02G.

Preferably the first preselected threshold magnitude comprises 0.001G.

Preferably the second preselected threshold magnitude comprises 0.001G.

Preferably the non-volatile computer memory device connection means is configured for connection to a secure digital (SD) card, or more preferably a microSD card.

Preferably the apparatus further comprises a Universal Serial Bus (USB) connector in communication with the processor.

Preferably the processor sends data indicative of the output of the accelerometer to the USB connector.

Preferably the apparatus comprises a battery.

Preferably the apparatus is operable without connection to any apparatus external of the housing.

Preferably the apparatus further comprises a wireless communication means.

Preferably the wireless communication means comprises one of a radio frequency transceiver, 3G transceiver or bluetooth module.

Preferably the wireless communication means is provided internally of the housing.

According to a third aspect of the present invention there is provided an apparatus for detecting and recording accelerations experienced by a structure substantially as herein described with reference to the accompanying drawings.

According to a fourth aspect of the present invention there is provided a method of operating an apparatus for detecting and recording accelerations experienced by a structure substantially as herein described with reference to the accompanying drawings.

According to a fifth aspect of the present invention there is provided an apparatus for detecting and recording accelerations experienced by a structure, the apparatus comprising:
a housing;
a processor provided within the housing;
an accelerometer connected to an interior of the housing and in communication with the processor;
non-volatile computer memory device connection means connected to the processor, the connection means adapted for releasable connection to at least one non-volatile computer memory device when in use;
wherein in use, when the accelerometer detects an acceleration event which has a magnitude greater than a preselected threshold magnitude, the processor records data indicative of an output of the accelerometer on a non-volatile memory device which is connected to the non-volatile computer memory device connection means.

According to a further aspect of the present invention there is provided a system for detecting and recording seismic activity comprising at least one apparatus of the fifth aspect and a base station, wherein the at least one apparatus and the base station are provided with communication means for communication from the at least one apparatus to the base station.

Preferably, in use, the base station operates in a lower power mode until it receives a communication from at least one of the at least one apparatus.

Preferably the base station creates a log file for each of the at least one apparatus.

Preferably the communication means are wireless communication means.

Preferably the communication means are operable to send information from the base station to the at least one apparatus.

According to a further aspect of the present invention there is provided a system for detecting and recording seismic activity and/or a method of operating a system for detecting and recording seismic activity substantially as herein described with reference to the accompanying drawings.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

DESCRIPTION OF POSSIBLE EMBODIMENTS OF THE INVENTION

Figure 1:
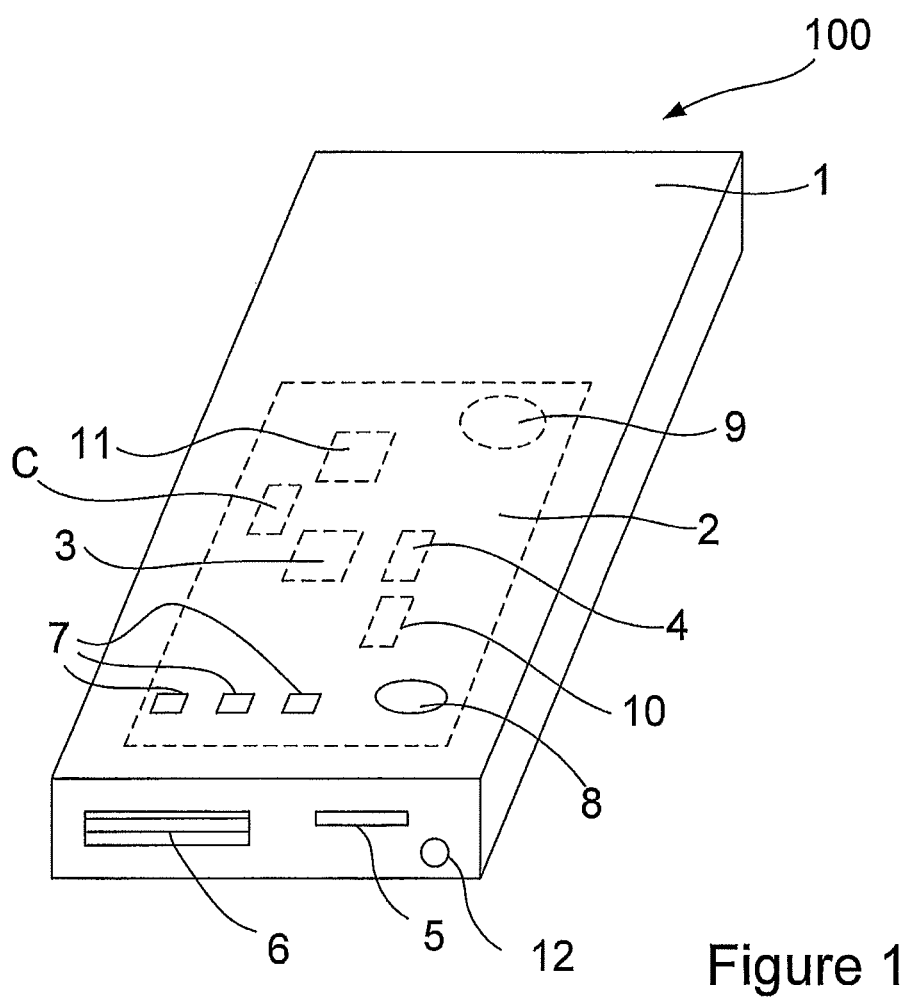
FIG. 1 is a diagrammatic isometric view of one embodiment of an apparatus for detecting and recording accelerations experienced by a structure according to the present invention, with internal electronic components shown in hidden detail.
Figure 2:
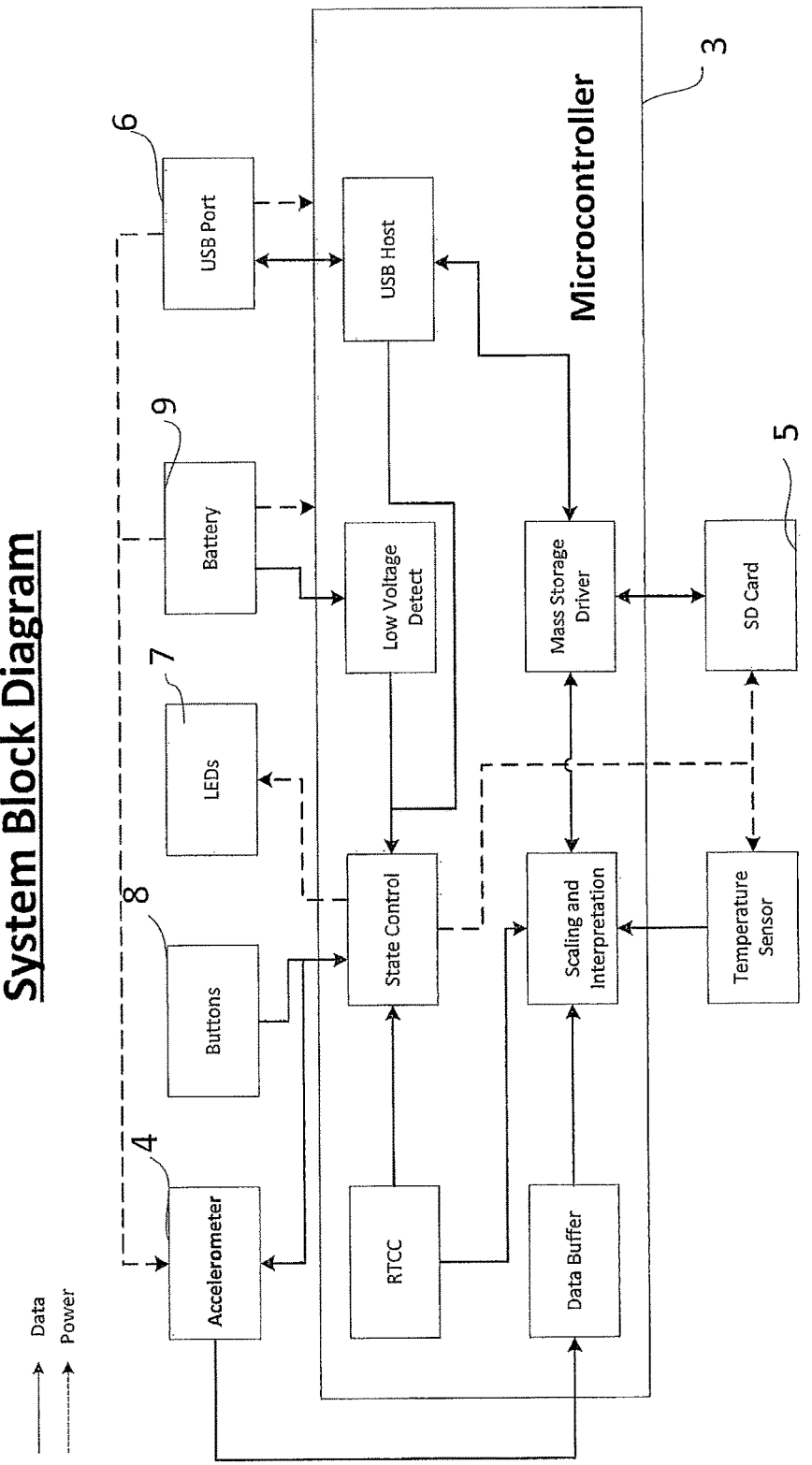
FIG. 2 is a system block diagram of the apparatus of FIG. 1.

Referring first to FIGS. 1 and 2, an apparatus for detecting and recording accelerations experienced by a structure according to one embodiment of the present invention is generally referenced by arrow 100. The accelerations recorded may be caused by seismic activity, winds, tsunami waves, nearby traffic, explosions, or any other phenomena which causes movement of the structure.

The apparatus 100, also referred to herein as a detector/recorder apparatus 100, comprises a housing 1. The housing 1 is preferably made from a non-conductive construction material, preferably a suitable plastic. In one embodiment the housing 1 is substantially 115 mm long and 80 mm wide.

A printed circuit board (PCB) 2 is contained within the housing 1. A processor 3 and accelerometer 4 are mounted within the housing 1, preferably to the PCB 2. The mounting of the accelerometer 4 should be such that it experiences substantially the same accelerations as the housing 1 (and the structural or building element the housing is attached to), with minimal, if any, damping.

The processor 3 is preferably a microprocessor, for example a PIC18F46J50 XLP microcontroller. The accelerometer is preferably a MEMS type accelerometer which can operate in a reduced power or "sleep state", more preferably one which also has an on-board buffer. The applicant has found the Analog, Devices ADXL362 Tri-Axial MEMS Accelerometer to be particularly suitable. In some embodiments one or more other sensors, for example a compass sensor C, are also provided. The compass sensor C, if provided, is preferably in alignment with the accelerometer. A Global Positioning System (GPS) sensor may also be provided in some embodiments.

The apparatus 100 is also provided with non-volatile computer memory device connection means 5, for example a secure digital (SD) card port, more preferably a microSD port. When in use, the apparatus 100 typically has a suitable non-volatile computer memory device, for example a microSD card, connected to the connection means 5.

In some embodiments a Universal Serial Bus (USB) port 6 is also provided. The non-volatile computer memory device connection means 5 and USB port 6 are operatively connected to the controller 3, as is the accelerometer 4.

A number of light emitting diodes (LEDs) 7 may also be provided, as well as one or more buttons 8, in order to facilitate setup, calibration and troubleshooting.

A battery 9 is also provided, connected to suitable mounting means (not shown), to power the apparatus 100. In a preferred embodiment the battery 9 is a CR2450 3V 620 mAH Lithium Coin Cell Battery. In another embodiment four 1.5V Lithium AA batteries may be used.

An internal temperature sensor 10 is preferably also provided. An auxiliary port 12 may also be provided, to which one or more external sensors such as an external temperature sensor and/or a relative humidity sensor may be connected. The auxiliary port 12 may additionally or alternatively be used to communicate with one or more external systems or devices, for example to send signals or triggers, or to receive data.

In some embodiments a wireless communication module 11 may be provided. This may comprise a radio frequency transmitter/receiver, 3G or bluetooth transceiver, or the like. In some embodiments such a module may be connected to the USB port 6, rather than being provided internally of the housing 1.

Figure 3:
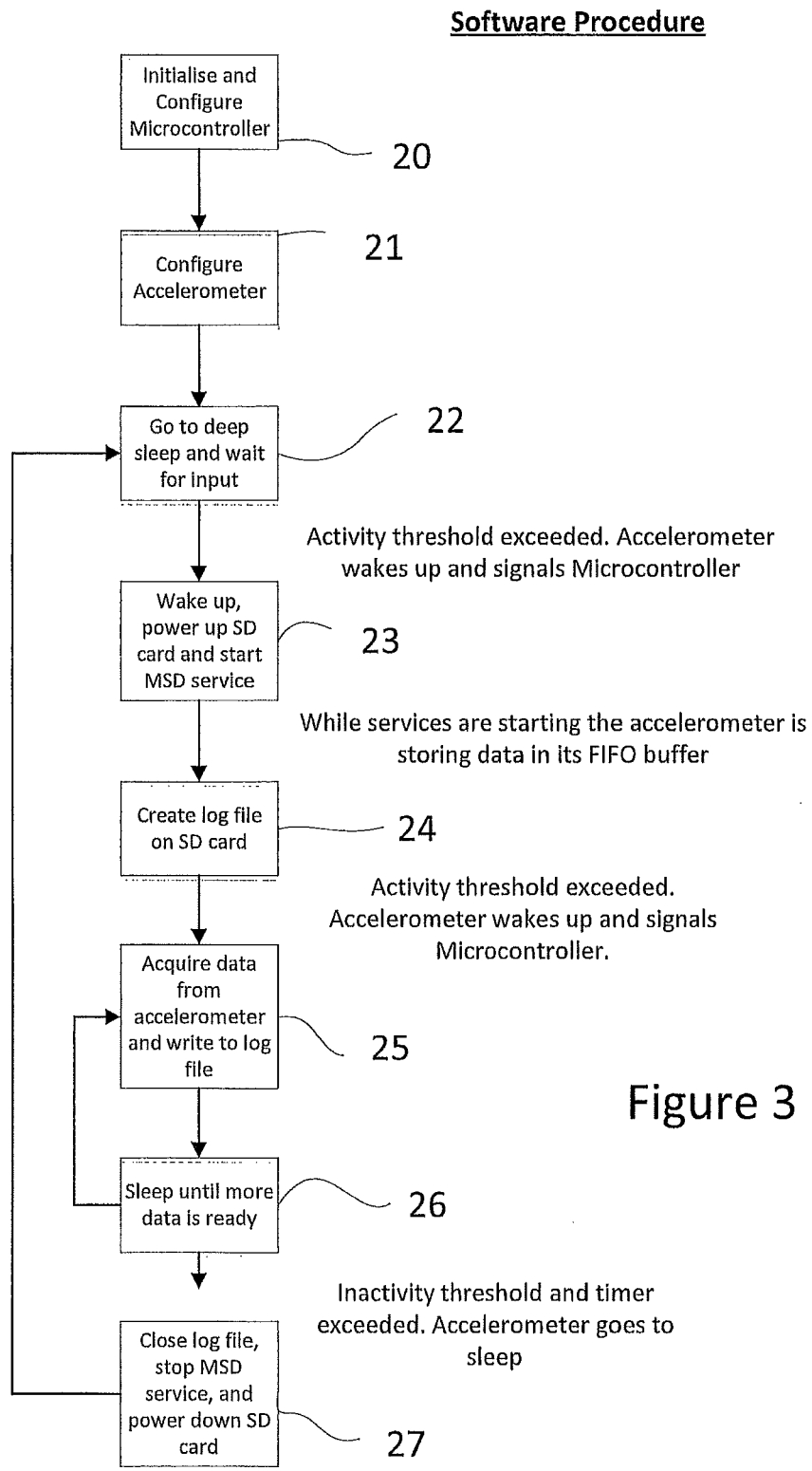
FIG. 3 is a flow chart showing one embodiment of a method of operation of an apparatus of the present invention.

Referring next to FIG. 3, an example of a method of operation of a preferred embodiment of the apparatus 100 will be described.

On powering up the apparatus 100 the processor 3 undergoes an initialisation and configuration step at step 20. Next the accelerometer 4 undergoes a configuration operation at step 21.

At step 22 the processor 3, accelerometer 4 and computer memory device are set to operate in a reduced power state, for example a "sleep" state. The processor 3, accelerometer 4 and computer memory device remain in the reduced power state until the accelerometer 4 detects an acceleration which exceeds a threshold magnitude. In a preferred embodiment the threshold acceleration may be 0.02G, although this may be adjusted as low as 0.001G in some embodiments.

When a sufficiently large acceleration is detected, the accelerometer 4 begins to operate in a fully operational state, and stores information in a buffer, preferably an on-board buffer. The processor also begins to operate in a fully powered state, and a mass storage device service is started, see step 23. A new log file is created on the microSD card at step 24. In embodiments of the invention where additional sensors other than the accelerometer are present, for example a compass C, information from those other sensors may also be stored in the on-board buffer. These additional sensors are preferably in a low power or "off" state until the accelerometer 4 detects an acceleration which exceeds the threshold magnitude.

At step 25 the data from the buffer is transferred to the microSD card. In preferred embodiments the data is pre-processed based on calibration factors before it is transferred to the memory device.

A feature of the present invention is that the processor is able to operate at a much higher rate than the accelerometer. Accordingly, in step 26, in order to minimise power usage, the processor and microSD card switch to the lower power state as soon as all of the data from the buffer has been transferred to the microSD card. The processor and microSD card remain at the low power state until the accelerometer signals that further information is stored in the buffer, ready for transfer, at which time the processor and microSD card switch back to the fully powered state again and transfer this new data, as in step 25.

This cycle repeats until a predetermined amount of time elapses during which no accelerations above a pre-determined threshold are detected during a preselected period of time (for example, no accelerations above 0.02G for 5 seconds), after which the accelerometer also switches to a reduced power state and the log file is closed, shown at step 27. Any other sensors, such as the compass and/or GPS sensor (if provided) may also return to a lower power or "off" status at this time.

The apparatus 100 waits in the reduced power state shown in step 22 until another acceleration which is above the threshold is detected, whereupon steps 23 to 27 are repeated.

If a suitable device is connected to the USB port (such as a laptop computer), then the device acceleration logs can be downloaded from the device. In addition to this, the device firmware can also be updated, and the device can be configured and the clock synchronized via a virtual serial port. If the wireless module has been installed on the device then all of the previous features are also available via that wireless connection, as well as the ability to time-synchronize multiple wireless-enabled devices at once.

While the apparatus 100 may be connected to other equipment via the USB port and/or wireless communication module 11, it may also operate and record data from one or more than one event while completely free of any connection to equipment external of the housing 1.

Data may be extracted from the apparatus via the USB port, or by removing the microSD card from its port. An advantage of using a non-volatile computer memory device such as a microSD card is that the data will not be lost if the apparatus 100 is destroyed, except in the unlikely event that the microSD card itself is destroyed.

Data may also be extracted via the wireless communication module 11, if one is provided. This module may also be used for configuration of the apparatus and/or time synchronisation.

Figure 4:
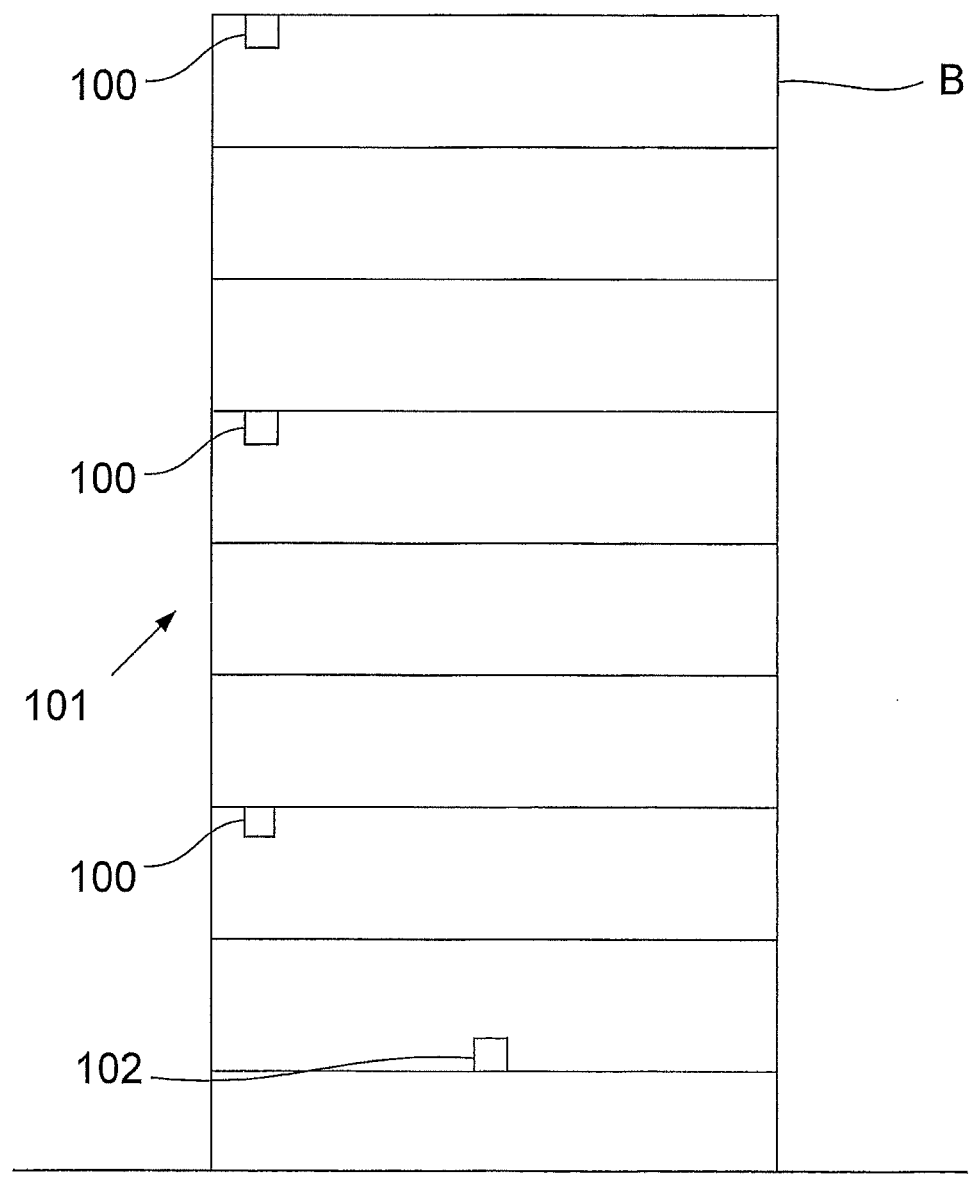
FIG. 4 Is a diagrammatic side view of a building provided with a system for detecting and recording accelerations experienced by a structure according to an embodiment of the invention.
Figure 5:
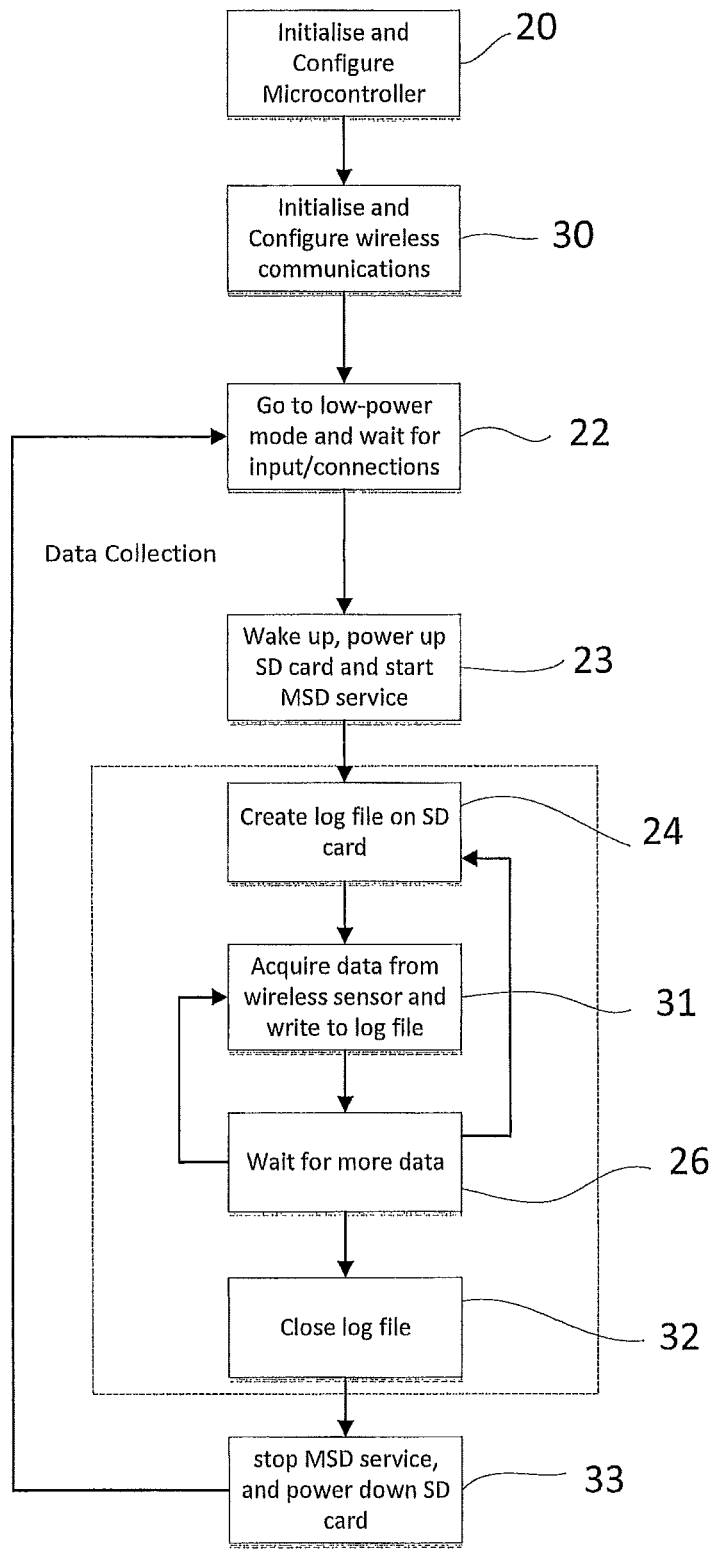
FIG. 5 is a flow chart showing one embodiment of a method of operation of a base station of the present invention.

Referring next to FIGS. 4 and 5, in some embodiments a plurality of detector/recorder apparatus 100 may be used in the same building B. In a preferred embodiment a system 101 for detecting and recording accelerations experienced by a structure may comprise the plurality of apparatus 100 and a base station 102. In one embodiment each apparatus 100 may be capable of operating in a base station mode, although in other embodiments the base station 102 may be of a different design to the detector/recorder apparatus 100. Where the base station 102 is a different design to the detector/recorder apparatus 100 it may be mains powered, with a battery backup. Where the base station 102 is a detector/recorder apparatus 100 it may also be powered from the mains, for example via the USB port.

Referring next to FIG. 5 in particular, in a preferred embodiment the base station 102 (or detector/recorder 100 operating in base station mode) operates as follows.

As with the detector/recorder 100, on powering up the base station 102 the processor 3 undergoes an initialisation and configuration step at step 20. Next the wireless communication hardware undergoes a configuration operation at step 30.

At step 22 the base station 102 is set to operate in a reduced power state, for example a "sleep" state, until it receives a communication from one or more detector/recorder 100, or from another remote source.

When the structural element to which the apparatus 100 is attached experiences an acceleration which is above a predetermined threshold, the processor also begins to operate in a fully powered state, and a mass storage device service is started, see step 23. For each detector/recorder apparatus 100 which is communicating with the base station 102, a new log file is created on the microSD card at step 24. At step 31 the data from the or each detector/recorder apparatus 100 is transferred to the microSD card. The base station 102 then waits for further input.

When a particular detector/recorder 100 has not sent any information for a predetermined length of time, the log file for that detector/recorder 100 is closed, at step 32. When no further information is being received from any of the detector/recorder apparatus 100, the system is powered down (step 33).

As shown in FIG. 5, the base station 102 receives data, usually wirelessly, from one or more remote detector/recorder apparatus 100, when an event which induces an acceleration above a pre-selected threshold in a part of the structure occurs. This allows the information about the event to be retrieved from a single source, rather than from each detector/recorder apparatus 100 individually. In a preferred embodiment the wireless communication is by a MiWi wireless protocol, although other protocols such as Wifi, Bluetooth and the like may also be used.

In one embodiment the base station 102 may be provided with a network/internet connection (either wired, cellular, or both) so that information can be retrieved remotely. The base station 102 may also be used to set up and/or push updates to the detector/recorder apparatus 100. The base station 102 may also monitor the status of the detector/recorder apparatus 100 on the network it maintains, for example by collecting information such as battery level, temperature and the like.

Before installation the hardware will be tested, a battery and microSD card installed, and the firmware updated to the correct production version.

The detector/recorder apparatus 100 will typically be installed in specific locations advised by a suitably qualified structural engineer. The apparatus may be enclosed in a protective casing (not shown). The apparatus is mounted directly to the floor, a wall, the underside of the floor, or other structural or building element with bolts and adhesive so that it experiences substantially the same accelerations as the building element to which it is attached. Once the apparatus is mounted, the installer turns the device on and follows a calibration routine as indicated by LEDs, using buttons on the device, a laptop physically connected to the device by USB, or by some combination of these.

Periodic checks, for example annually, will need to be made to check the battery status of the device. However, because of its extremely lower power use, the apparatus will be able to operate for up to 5 years between battery changes.

Those skilled in the art will appreciate that preferred embodiments of the present invention provide an apparatus for detecting and recording accelerations experienced by of a structure which is compact, self-contained, low maintenance and relatively low cost, and a method of operating the apparatus which results in relatively low power consumption and extended battery life.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the appended claims.

What we claim is:

1. A method of operating an apparatus for detecting and recording accelerations experienced by a building, the apparatus comprising an accelerometer, a processor and a non-volatile computer memory device, the method comprising the following steps:
   i. operating the processor, accelerometer and computer memory device in a reduced power state;
   ii. in response to detecting an acceleration experienced by the building having a magnitude which is greater than a first preselected threshold magnitude, switching the accelerometer to a fully operational state and storing accelerometer data in a buffer;
   iii. switching the processor and computer memory device to a fully operational state;
   iv. operating the processor to store the accelerometer data from the buffer in the computer memory device;

v. switching the processor and computer memory device to a reduced power state until the accelerometer signals that further data is available, and storing any further accelerometer data in the buffer;

vi. repeating steps iii) to v) until a predetermined time has elapsed since the accelerometer last detected an acceleration having a magnitude which is greater than a second preselected threshold magnitude.

2. The method of claim 1 comprising the further step of:

vii. switching the processor, accelerometer and computer memory device to the reduced power state.

3. The method of claim 2 comprising repeating steps i) to vii).

4. The method of claim 1, wherein step iii) further comprises creating a new file on the computer memory device and step iv) further comprises storing the accelerometer data from the buffer in the new file.

5. The method of claim 1, wherein the first preselected threshold magnitude equals 0.02G.

6. The method of claim 1, wherein the first preselected threshold magnitude equals 0.001G.

7. The method of claim 1, wherein the second preselected threshold magnitude equals 0.02G.

8. The method of claim 1, wherein the second preselected threshold magnitude equals 0.001G.

9. The method of claim 1, wherein the predetermined time comprises 5 seconds.

10. The method of claim 1, wherein the apparatus further comprises an additional sensor and step ii) further comprises switching the additional sensor to fully operational state and storing data from the additional sensor in the buffer.

11. The method of claim 10 wherein step v) further includes the step of switching the additional sensor to a reduced power state or an off state.

12. The method of claim 1, wherein the non-volatile computer memory device comprises a secure digital (SD) card.

13. The method of claim 1, wherein the apparatus further comprises a Universal Serial Bus (USB) connector in communication with the processor, and wherein the processor sends data indicative of the output of the accelerometer to the USB connector.

14. An apparatus for detecting and recording accelerations experienced by a building, the apparatus comprising a housing, a processor provided within the housing, an accelerometer connected to an interior of the housing an in communication with the processor, and non-volatile computer memory device connection means connected to the processor, the connection means adapted for releasable connection to at least one non-volatile computer memory device, wherein, in use:

i. the processor, accelerometer and computer memory device initially operate in a reduced power state;

ii. the accelerometer switches to a fully operational state and stores accelerometer data in a buffer in response to detecting an acceleration experienced by the building having a magnitude which is greater than a first preselected threshold magnitude;

iii. the processor and computer memory device switch to a fully operational state in response to the accelerometer detecting an acceleration having a magnitude which is greater than a first preselected threshold magnitude;

iv. the processor stores the accelerometer data from the buffer in a computer memory device which is coupled to the connection means;

v. the processor and computer memory device switch to a reduced power state until the accelerometer signals that further data is available, and stores any further accelerometer data in the buffer; and vi. the apparatus repeats steps iii) to v) until a predetermined time has elapsed since the accelerometer last detected an acceleration having a magnitude which is greater than a second preselected threshold magnitude.

15. The apparatus of claim 14 wherein the first and second preselected threshold magnitude comprise 0.02G.

16. The apparatus of claim 14 wherein the first and second preselected threshold magnitude comprise 0.001G.

17. The apparatus of claim 14, wherein the non-volatile computer memory device connection means is configured for connection to a secure digital (SD) card.

18. The apparatus of claim 14 further comprising a Universal Serial Bus (USB) connector in communication with the processor.

19. The apparatus of claim 18 wherein the processor sends data indicative of the output of the accelerometer to the USB connector.

20. The apparatus of claim 14 further comprising a battery.

21. The apparatus of claim 20 wherein the apparatus is operable without connection to any apparatus external of the housing.

22. The apparatus of claim 14 further comprising a wireless communication means.

23. The apparatus of claim 22 wherein the wireless communication means comprises one of a radio frequency transceiver, 3G transceiver or bluetooth module.

24. The apparatus of claim 22 wherein the wireless communication means is provided internally of the housing.

* * * * *